United States Patent [19]

Evertsen

[11] Patent Number: 4,988,116

[45] Date of Patent: Jan. 29, 1991

[54] TRAILER HITCHING AID

[76] Inventor: Gary L. Evertsen, 4627 Porter Ave., Ogden, Utah 84403

[21] Appl. No.: 335,856

[22] Filed: Apr. 10, 1989

[51] Int. Cl.[5] .............................................. B60D 1/36
[52] U.S. Cl. .................................. 280/477; 340/686; 340/687
[58] Field of Search ................ 280/477, 504; 340/686, 340/687, 431; 33/264

[56] References Cited

U.S. PATENT DOCUMENTS

| | | | |
|---|---|---|---|
| 2,797,406 | 6/1957 | Tanis et al. | 340/687 X |
| 3,227,888 | 1/1966 | Shepherd et al. | 340/686 X |
| 3,295,117 | 12/1966 | Ault et al. | 340/686 X |
| 3,411,076 | 11/1968 | Federici et al. | 340/686 X |
| 3,479,582 | 11/1969 | Meyer | 340/686 X |
| 3,594,740 | 8/1967 | Comeau | 340/686 X |
| 3,852,661 | 12/1974 | Szabo et al. | 340/686 X |
| 3,924,257 | 12/1975 | Roberts | 280/477 X |
| 4,165,501 | 8/1979 | Bongort et al. | 340/686 X |
| 4,285,138 | 8/1981 | Berry | 280/477 X |

Primary Examiner—Richard A. Bertsch
Assistant Examiner—Alan M. Kagen
Attorney, Agent, or Firm—A. Ray Osburn

[57] ABSTRACT

A trailer hitch positioning aid having a magnetic switching unit mounted upon the hitch ball and a corresponding permanent magnetic field unit secured to the socket of the hitch. The magnetic switches are mounted about the ball in a triangular pattern, while the magnetic field is in a "U" shape, so that closing of one or more of the magnetic switches indicates relative position of the hitch ball and socket. No physical connection is necessary between the trailer and the towing vehicle.

3 Claims, 4 Drawing Sheets

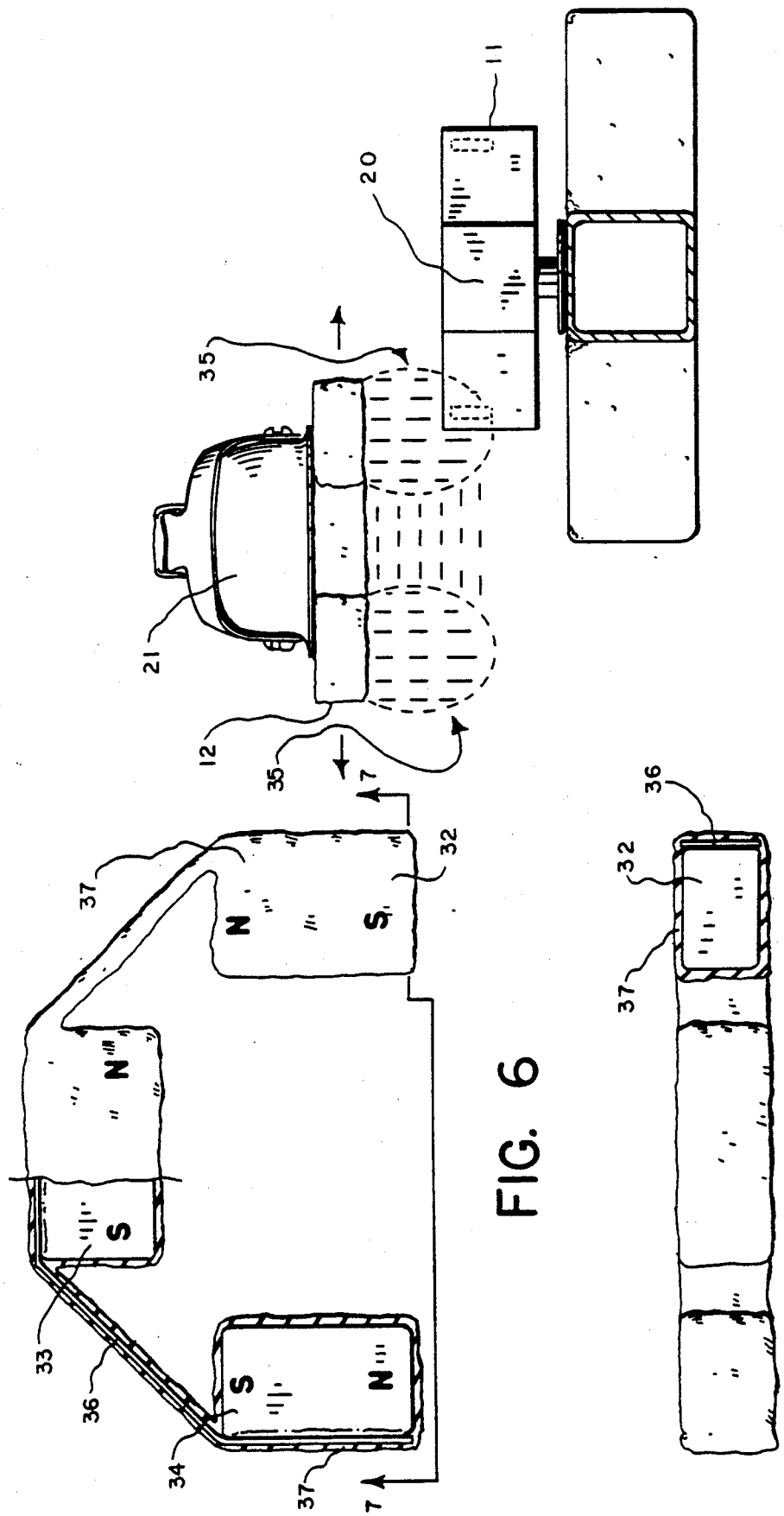

TRAILER HITCHING AID

BACKGROUND OF THE INVENTION

1. Field

The field of the invention is devices for positioning towing vehicles for engagement of hitches with trailers and the like. More particularly, the invention is concerned with indicators visible to the operator of the towing vehicle, showing the relative position of the mating elements of the connecting hitches.

2. State of the Art

Typically, hitches for connecting towing vehicles with trailers include a coupling ball upon the vehicle and a mating socket upon a forwardly projecting tongue upon the trailer Both ball and socket are located centrally, at bumper level, and are thus not in direct view by the vehicle operator. Hookup requires much trial and error, the unaided operator typically dismounting repeatedly to check the ball position relative to the socket. Damage to the vehicle or trailer is a real possibility with such blind maneuvering. Many sighting devices have been put forth to solve this problem. Most such devices include a pair of co-operating visual aids, one secured to the trailer and the other secured to the towing vehicle, so that alignment of the hitch components may be made by maneuvering the vehicle from the driver's seat. Representative of these are U.S. Pat. Nos. 3,918,746, 4,285,138 and 4,065,147. Most of these devices are either impractical, easily damaged, or prohibitively expensive. Some hitching assemblies have complicated pivoting components and mechanical guiding members permitting less precise positioning of the vehicle by the operator. (U.S. Pat. Nos. 2,197,157 and 2,844,390)

Other devices recognize the shortcomings of all of the line of sight devices, and provide for "blind" coupling, depending upon electronic sensors, signal transmitters and the like.

Many of these devices, however, are electromechanical, in that some physical connection between the towed and the towing vehicle is necessary. U.S. Pat. No. 4,030,775 utilizes a spool of wire with a microswitch connected to a display to show how much of the wire is extended or retracted, which indicates relative coupling positions of the hitch components. Similarly, U.S. Pat. No. 4,432,563 utilizes a wire, with the added provision for indication of the direction of deviation of the wire from axial alignment as the towing vehicle maneuvers. Other patents utilizing a combination of electronics, display, and switching devices include U.S. Pat. Nos. 2,797,406 (hitch contact switches carried by towing vehicle), 3,418,628 (position switches tripped by ball) and 4,187,494 (flexure of a member utilized as a sensing means for indication of relative angular and linear positions). U.S. Pat. No. 3,825,921 utilizes a wave emitter on the towing vehicle and a wave receiver coil on the trailer. A current is induced in the coil, which is monitored to show relative positions of the emitter and receiver coils. The physical connection between the towing and the towed vehicles is in this case an electrical conductor. However, a considerable number of components and electrical controls are necessary. In contrast, U.S. Pat. No. 3,924,257 employs no mechanical connection between the trailer and towing vehicle. However, an electrically powered transmitter must be provided on the trailer and a separately powered receiver on the towing vehicle.

Thus, all prior art devices, whether purely mechanical line of sight, electro mechanical, or completely electrical, are complex and expensive, perhaps more so than justified for solution to the problem. Clearly, there is a need for an effective trailer hitching aid which avoids the complexity and expense of line of sight devices, electromechanical combinations, and needlessly sophisticated electronics.

BRIEF SUMMARY OF THE INVENTION

With the foregoing in mind, the present invention eliminates or substantially alleviates the shortcomings in prior art trailer hitching aids A set of magnetically actuated switches is provided spaced apart, preferably about the connecting element of the hitch carried by the towing vehicle, typically the ball A permanent magnet device is carried by the mating hitching element, typically the socket on the trailer tongue. The magnet device creates a permanent field of a size and shape relating to the pattern defined by the switches. Preferably, at least two magnetic switches are provided spaced apart laterally, so that the towing vehicle operator may guide the vehicle accurately enough initially to actuate at least one of the switches by contact with a part of the magnetic field. The invention is used with associated circuitry and a display panel, auditory signal device or the like indicating the open or closed condition of the switches.

Preferably, three switches are used, arranged in a triangular pattern about the ball. The rearmost two indicate lateral position of the ball from a position of alignment. Proper axial position of the ball is indicated by the third, foremost, switch. The corresponding permanent magnetic field is preferably provided about the socket in a rearwardly opening "U" shape. A laterally misaligned attempt to place the vehicle for hitching may result, for example, in actuation of only one of the side switches before the vehicle is backed beyond axial hitching position. The lateral position of the ball is then adjusted on subsequent trials, until at least one side switch and the center switch are both actuated. The hitching ball is then in satisfactory position for connection with the socket. Actuation of both side switches simultaneously indicates very accurate axial alignment; simultaneous actuation of all three indicates very accurate positioning for connection. The closing of the switches may be displayed by a corresponding set of three display lights. Advantageously, battery powered light emitting diodes may be utilized.

According to one aspect of the invention, the switches are contained within an appropriately shaped housing adapted to be inserted around the ball and subsequently removed from the ball when the proper alignment has been achieved. Similarly, it is advantageous to have the magnetic field device detachable from the socket tongue.

It is therefore the object of the invention to provide an improved, economical trailer hitching aid, with no moving mechanical parts and no physical contact or connection between the towed and towing vehicle until hitch positioning is complete.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
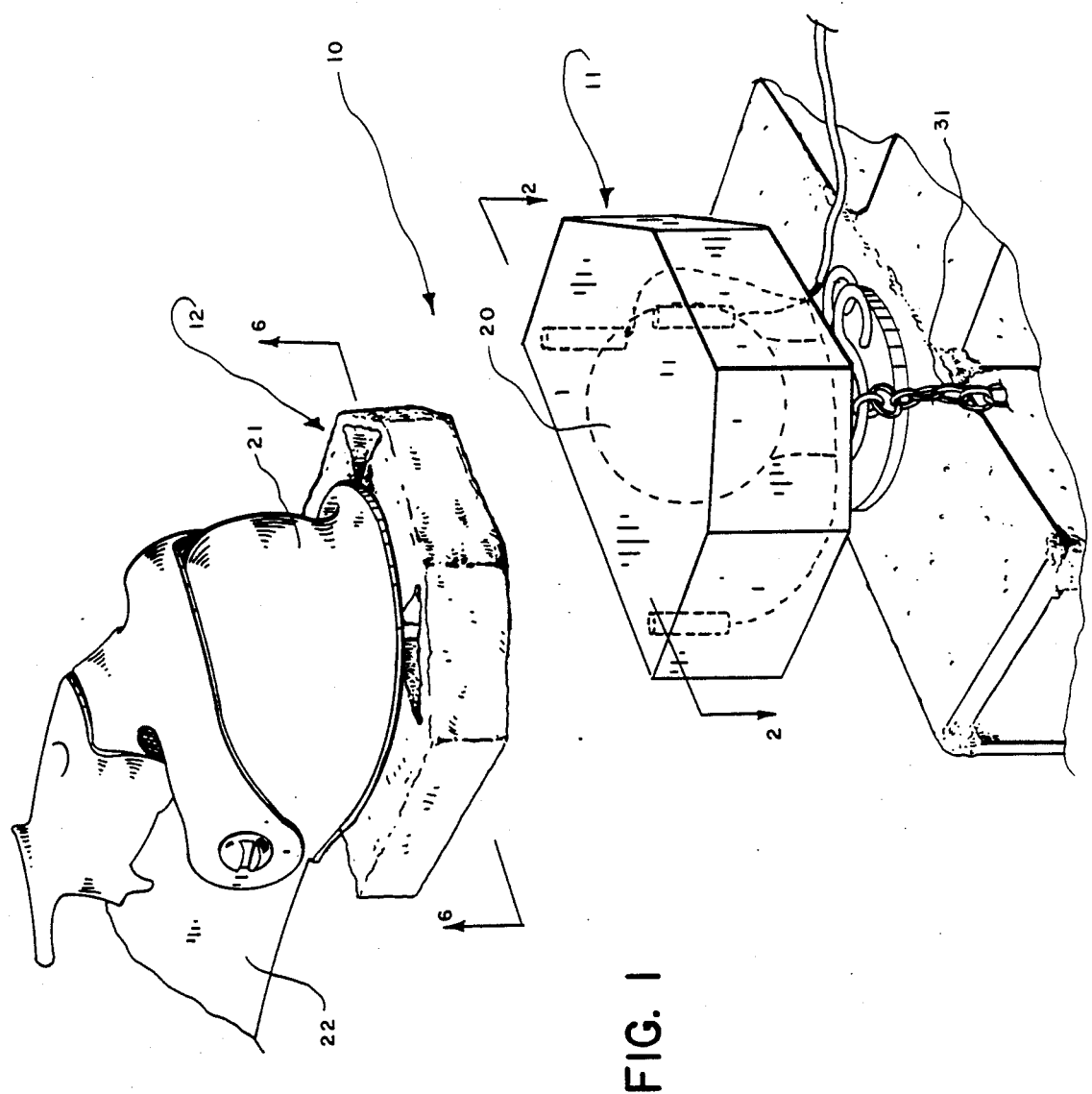
FIG. 1 is a reduced scale perspective view of the magnetic switching unit and the magnetic field unit of the inventive trailer hitching aid secured to the ball and socket respectively of a trailer hitch, in relative position as during positioning for hookup, FIG. 2 a plan view of the switching unit of FIG. 1, taken along line 2—2 thereof, drawn to the same scale, FIG. 3 a vertical sectional view of the switching unit of FIG. 2, shown mounted upon the hitching ball, drawn to the same scale, FIG. 4 a bottom view of the switching unit of FIG. 3, taken along line 4—4 thereof, drawn to the same scale, FIG. 5 a vertical sectional view of the switching unit of FIG. 2, taken along line 5—5 thereof, drawn to the same scale, FIG. 6 a plan view of the magnetic field unit of FIG. 1, taken along line 6—6 thereof, partially cut away, drawn to the same scale, FIG. 7 a partial vertical sectional view of the magnetic field unit of FIG. 6, taken along line 7—7 thereof, to same scale, FIG. 8 an elevation view of the switcher and magnetic field units installed upon the trailer ball and hitch respectively in a trial hitching position, drawn to a smaller scale than FIG. 1, FIG. 9 a perspective view of a display unit in accordance with the invention, mounted in the rear corner of the towing vehicle cab, and FIG. 10 a schematic electrical diagram for the trailer hitching aid.
Figure 4:
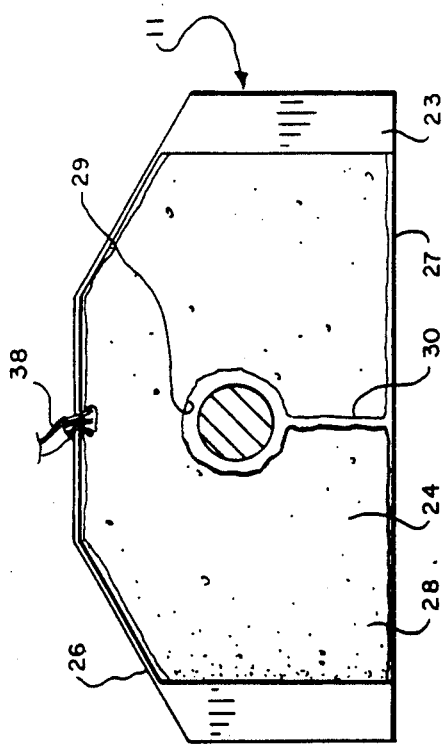
Figure 5:
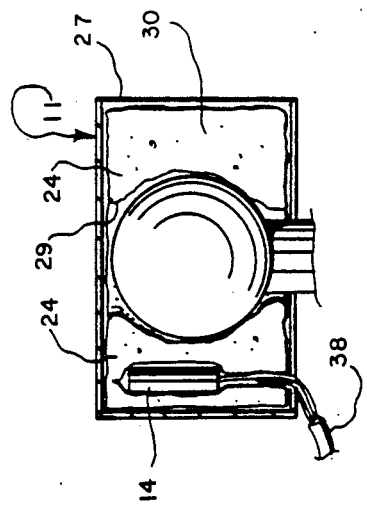
Figure 2:
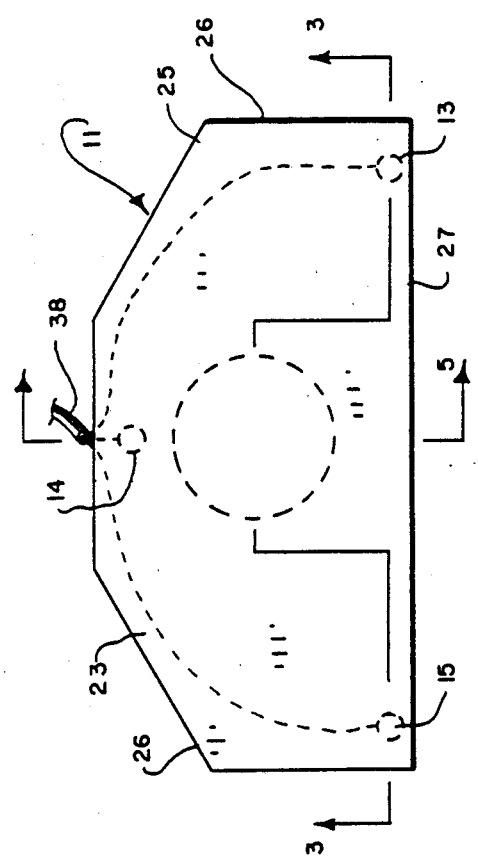
Figure 3:
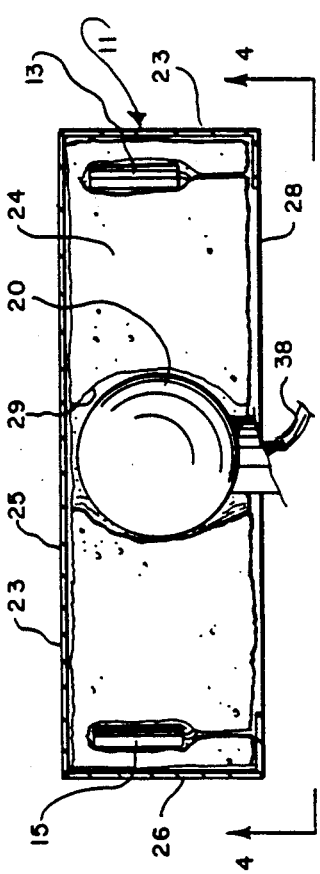
Figure 9:
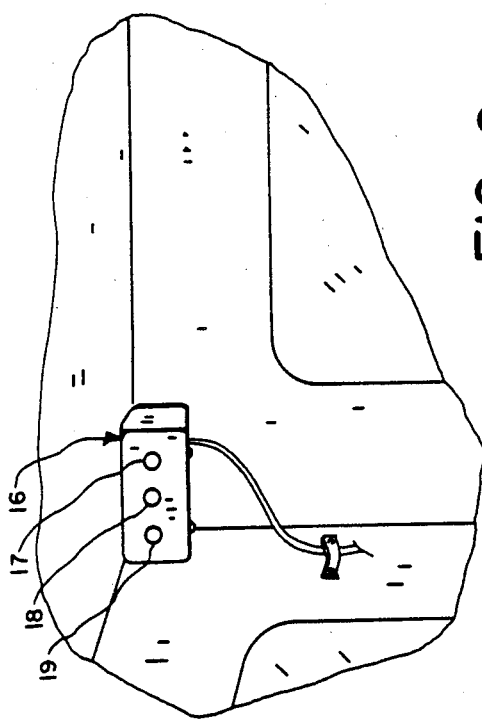
Figure 10:
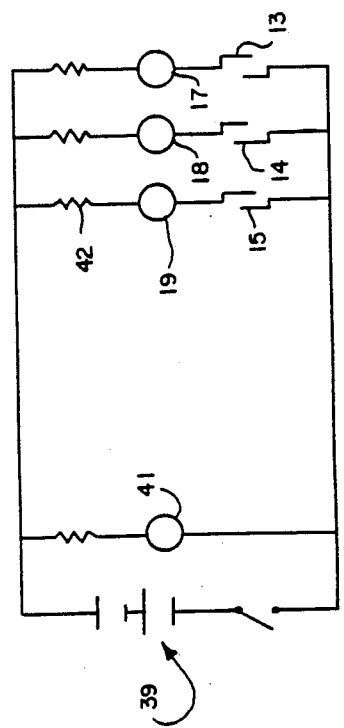

Vehicle trailer hitching aid 10 includes a magnetic switching unit 11 and a permanent magnet assembly 12. (FIG. 1) Switching unit 11 has a set of three magnetically actuated switches 13, 14 and 15. Associated with hitching aid 10 is an illuminated display 16 with a set of lights 17, 18 and 19, with connecting electrical circuitry to switches 13, 14 and 15 respectively. (FIGS. 9 and 10) For hitching, Switching unit 11 is temporarily secured about the hitch ball 20, mounted at the rear of the towing vehicle, not shown. Magnetic field assembly 12 is attached to the socket assembly 21 on the tongue 22 of the trailer, not shown.

In the illustrated embodiment of switching unit 11, the three magnetically actuated switches are mounted within non-magnetic housing 23, of aluminum for example. The magnetic switches surround ball 20 in a triangular pattern, switches 13 and 15 rearward and sidewise and switch 14 forward and center. Elastic foam filler 24 occupies the housing and holds the switches. Housing 23 has an uppermost horizontal plate 25 and a downstanding five-panel wall 26, but its rearmost end 27 and its bottom 28 are substantially open. (FIGS. 2-5) A downwardly opening cavity 29 central to elastic foam filler 24 expands to accept ball 20. A vertical slit 30 connects cavity 29 to rearmost end 27, to facilitate installation and removal onto and from ball 20. A clip and chain assembly 31 may be provided to conveniently store switching unit 11 between uses, suspended from ball 20.

The three permanent bar magnets 32, 33 and 34 of magnetic field assembly 12 are secured in a rearwardly opening "U" pattern generally matching the width and depth of the triangle of magnetic switches. (FIGS. 6 and 7)

The two side magnets 32 and 34 are each oriented with the polarity of its foremost end the same as the polarity of the adjacent end of the transverse front magnet 33. (FIG. 6) The individual field surrounding each of the side magnets is thus not greatly distorted by proximity to the rear magnet, the field of which is similarly undistorted. Side magnets 32 and 34 are spaced apart sufficiently to each have completely separated surrounding fields. The combined field 35 is "U" shaped, conforming to the three magnets. Each of the switches 13 14 and 15 will be closed only when moved into one of the side legs or the rear leg of the combined magnetic field 35. In FIG. 8, for example, ball 20 is shown misaligned to the left of socket 21, so that only the right side switch 13 is closed by contact with the left leg of the magnetic field 35.

The magnets, along with a steel outer band 26 to which they are magnetically attached, may advantageously be bound together and protected by a coating 37 of thermosetting neoprene or the like. During hitching, permanent magnet assembly 12 clings to socket assembly 21 in the desired position and orientation. (FIG. 1) Between uses, it may be conveniently attached magnetically to the trailer on metal tongue 22, e.g.

Circuitry connects each magnetic switch with one of a set of three indicating lights 17, 18 and 19 carried by display unit 16. The lights are preferably light-emitting diodes (LED). (FIGS. 9 and 10) The supply and return leads (4) are gathered into a cable 38 at the rear of switcher 11. Preferably, the system includes direct current batteries 39, rather than using the vehicle battery. Switches 13, 14 and 15 may be selected from among available types of magnetically actuated switches. Reed types, such as Minature Magnet Reed Switch No. MDRR-4-185 of Hamblin Manufacturing Company, California, are quite satisfactory. A pair of standard 1 ½ volt dry cell batteries 39 provide a total of 3 volts. Resistors 42 reduce the voltage to each LED to the desired 2.7 volts.

An on-off switch 40 and an LED on-off indicator light 41 are also desirable. Preferably, the batteries, and the on-off switch and indicator are packaged in a control unit, not shown, conveniently mounted upon the dashboard of the towing vehicle. It is also convenient to provide male and female plugs. not shown, in the switcher cable 38, to permit convenient disengagement of switching unit 11 from the vehicle.

For operator convenience, display 16 may be mounted on the right side of the back wall of the vehicle cab. This places it, along with the rear window, in view of the operator as he backs into hitching position. The right, center and left lights 17, 18 and 19 are preferably connected respectively to the right, center and left switches 13, 14 and 15. Illumination of either right or left lights 17 or 19 then indicates the vehicle is too far to the right or left respectively. Illumination of both right and left side lights indicates correct lateral position. The center light 18 illuminates when the vehicle is in axial position for hitching. If the center and either one or both of the side lights are lit, the ball 20 and socket 21 are close enough together for the socket to be placed downward upon the ball to complete the hookup. Preferably, the spacing of the magnetic switches and the shape and strength of the magnetic field generally prevent illumination of the center light 40 alone. Of course, illumination of all three lights indicates highly accurate placement for the hookup.

Side magnetic switches 13 and 15, and side magnets 32 and 34 are spaced sufficiently apart to provide a manageable target for initial placement by eye. A lateral distance of about 6 inches between these switches is sufficient for typical tow vehicle operators.

The hitching aid 10 may differ in detail from the embodiment illustrated and described. Greater or lesser numbers of magnetic switches may be utilized, arranged in various other patterns. The magnetic field may be differently shaped, and the display unit may be located elsewhere upon the towing vehicle. Or the switching unit 11 could be adapted for mounting on the trailer, with the display, batteries and circuitry also trailer mounted. Or, the display 16 could be adapted for auditory, rather than visual, indication of switch closing.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A towing vehicle positioning aid for joining a vehicle mounted hitching ball to a trailer mounted ball accepting socket, the positioning aid comprising:

switching means including a set of three magnetically actuated normally open switches spaced apart about the ball in a triangular pattern, the rearmost side thereof being lateral to the vehicle and rear of the ball; and a set of three permanent bar magnets generating a permanent magnetic field having a pair of side segments disposed on each side of the socket parallel to the trailer longitudinal axis and a segment perpendicular to said axis connecting the pair of ends of the side segments which are forward of the socket, so that the closing of only one or two of the switches corresponds to the direction of deviation of the position of the ball from the socket; and means indicating to the vehicle operator the open or closed condition of each of the switches as the vehicle is maneuvered into trial hitching positions.

2. The vehicle positioning aid of claim 1, wherein the switch condition indicating means comprises:

a set of three indicator lights;

electrical circuitry connecting each light to one of the magnetic switches; and a source of electrical power, so that each light is illuminated when its corresponding magnetic switch is closed under the influence of the magnetic field.

3. The vehicle positioning aid of claim 1, wherein the switch condition indicating means comprises:

auditory signal means.

* * * * *